Jan. 2, 1962 D. L. CAMPBELL 3,015,196
METHOD OF MAKING SPECTACLE LENSES
Filed Dec. 7, 1959 4 Sheets-Sheet 1
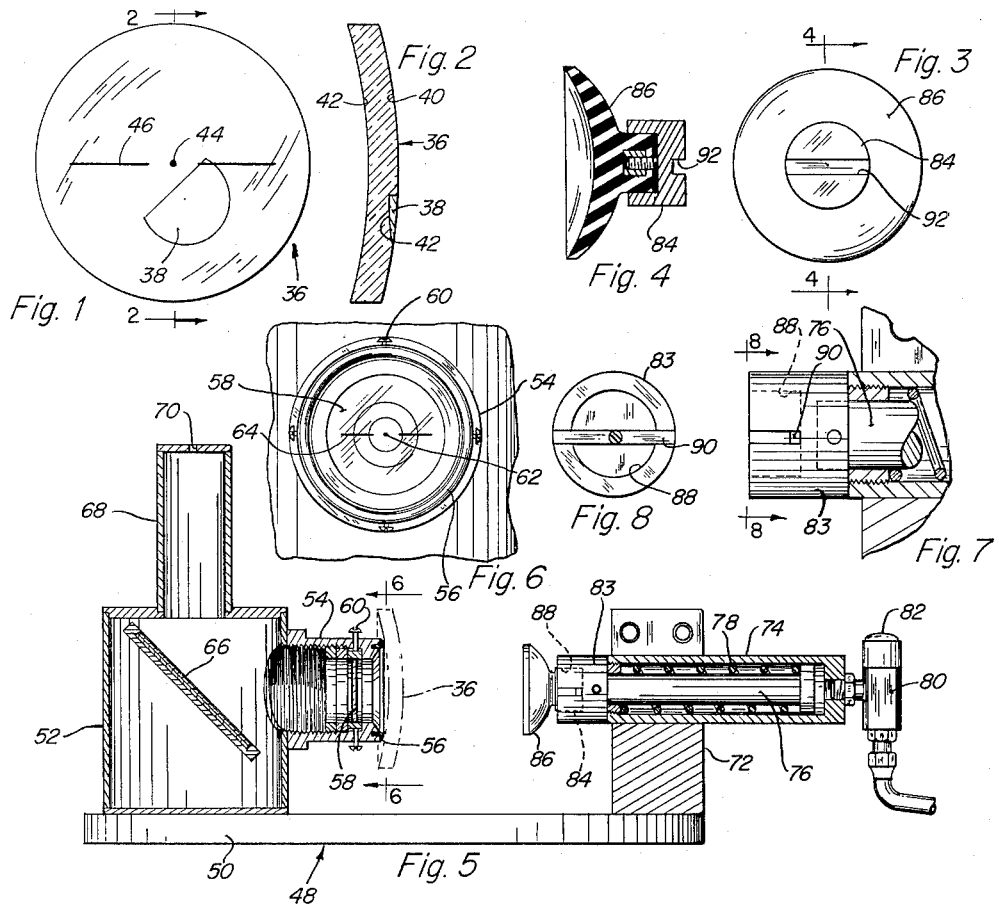
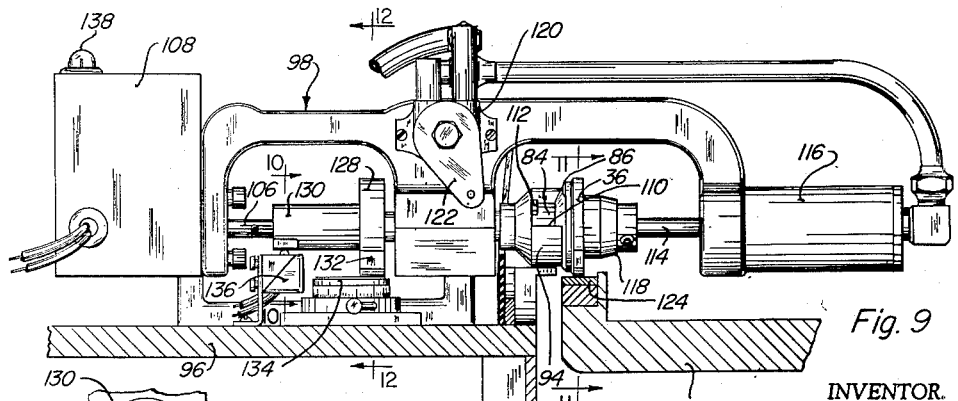
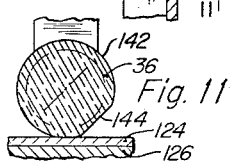
INVENTOR.
DAVID L. CAMPBELL
BY
Buckhorn, Cheatham & Blore
ATTORNEYS

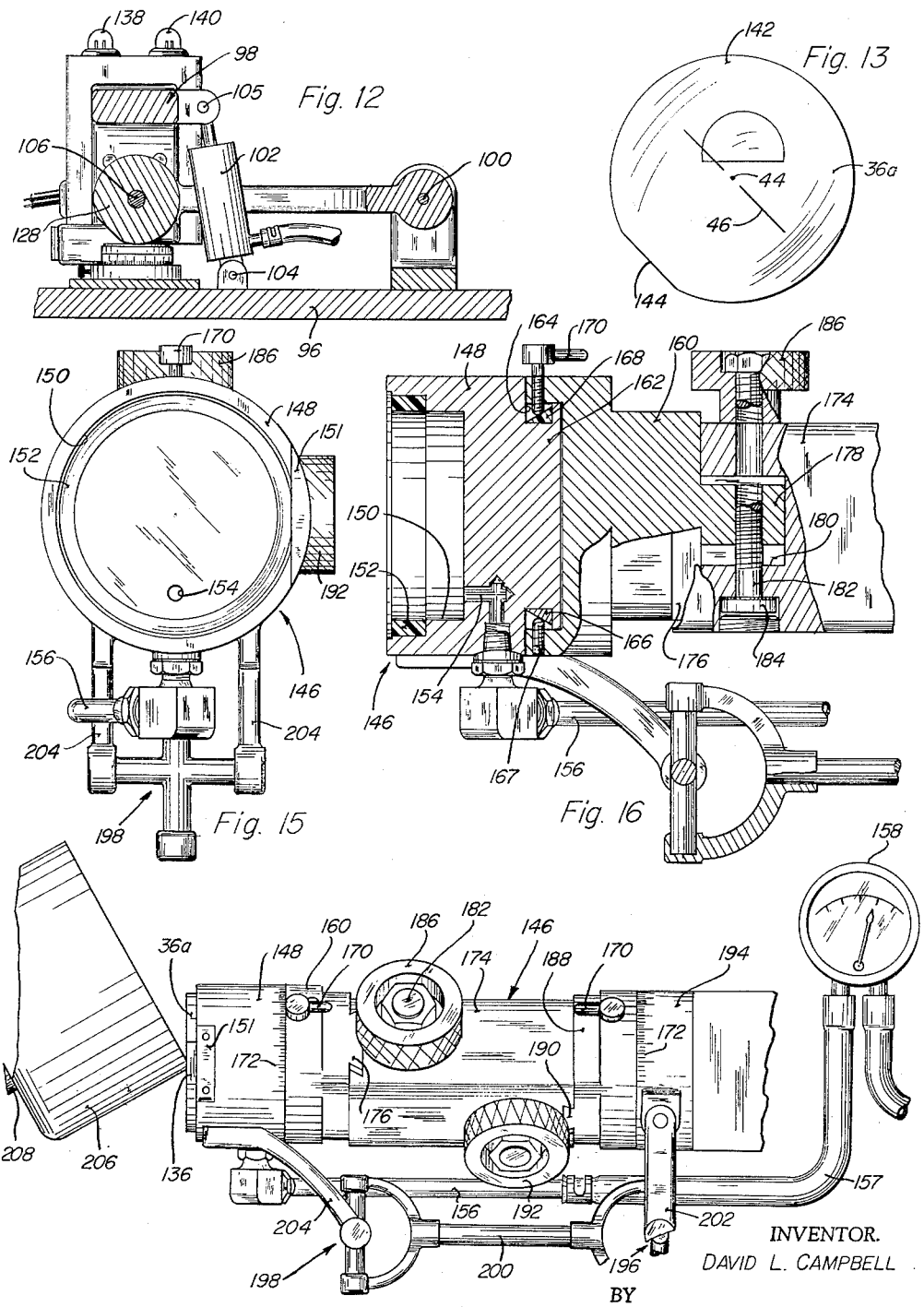

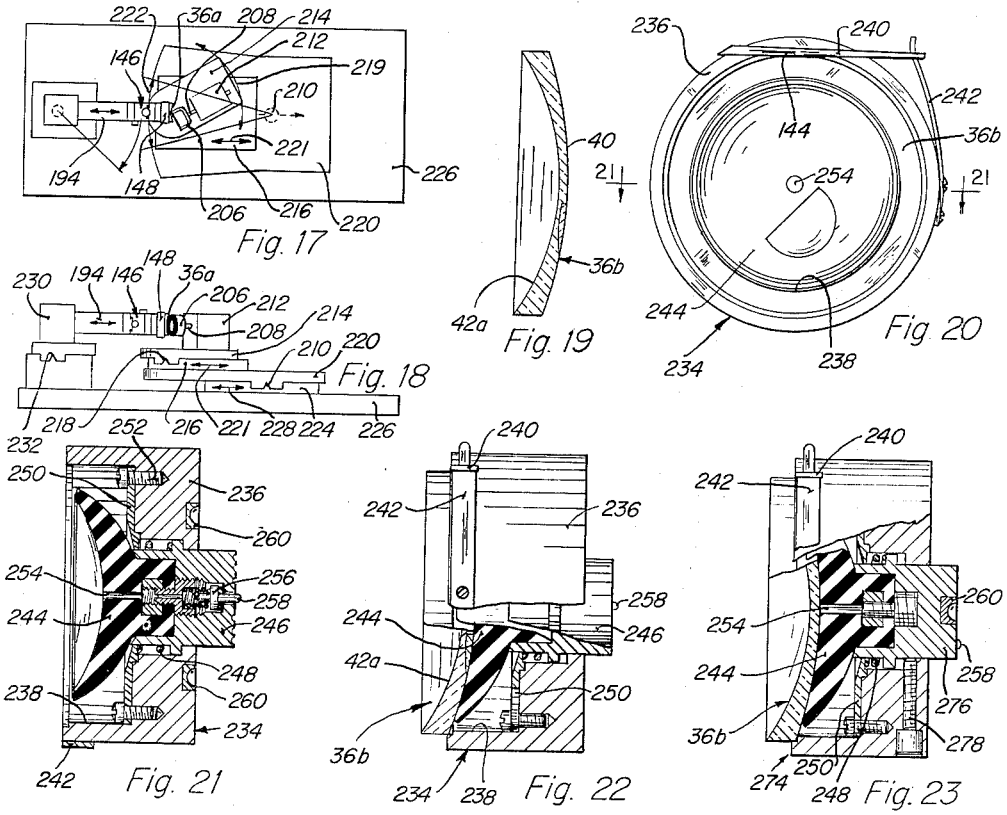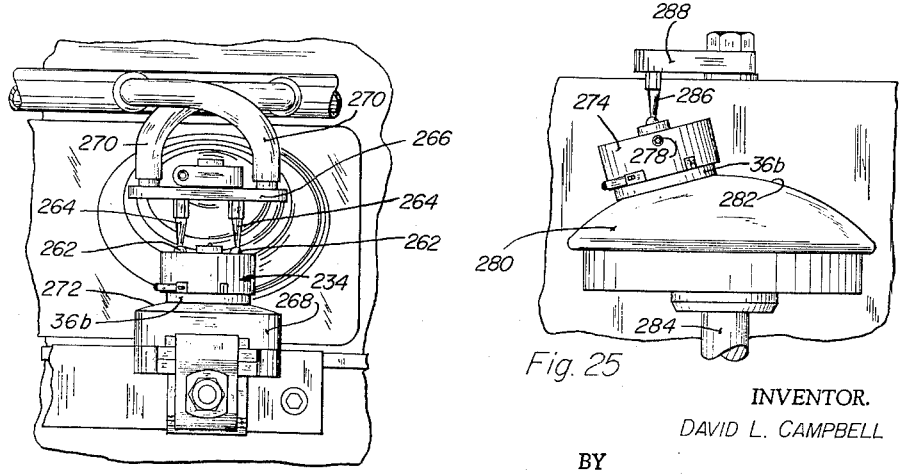

Jan. 2, 1962   D. L. CAMPBELL   3,015,196
METHOD OF MAKING SPECTACLE LENSES
Filed Dec. 7, 1959   4 Sheets-Sheet 4
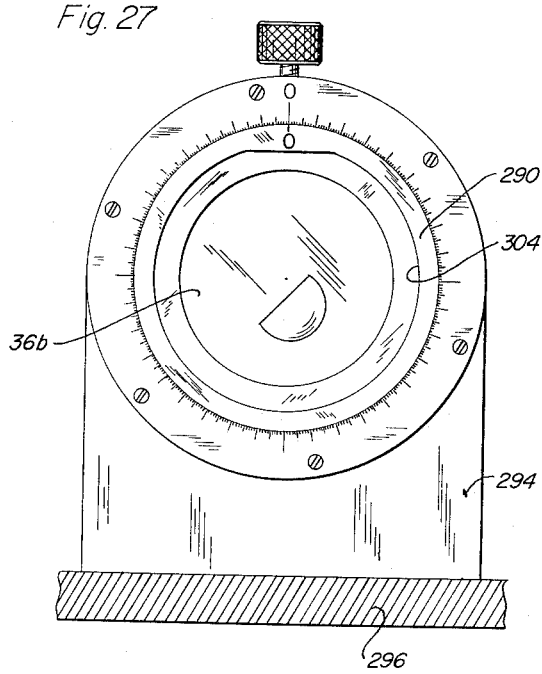
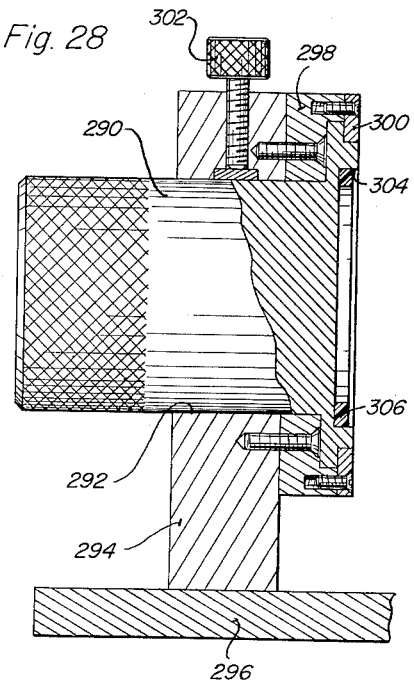
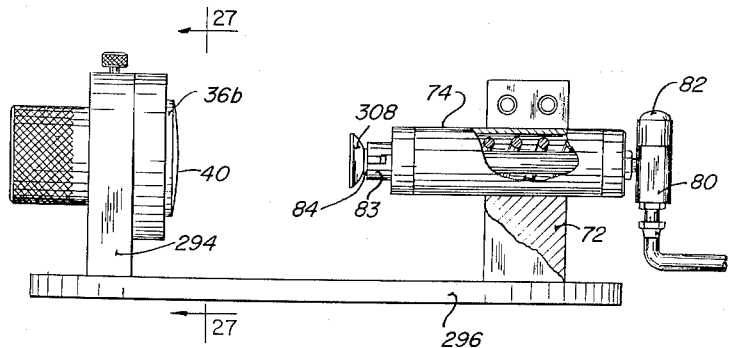
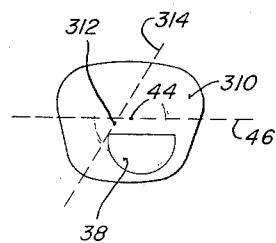
INVENTOR.
DAVID L. CAMPBELL
BY
Buckhorn, Cheatham & Blore
ATTORNEYS

3,015,196
METHOD OF MAKING SPECTACLE LENSES
David L. Campbell, Reno, Nev.
(318 SW. Washington St., Portland 4, Oreg.)
Filed Dec. 7, 1959, Ser. No. 857,677
16 Claims. (Cl. 51—284)

This invention relates to a method of making spectacle lenses from glass lens blanks having a polished lens surface on one of the faces thereof, and more particularly relates to an improved method of griding and polishing prescription lens surfaces on the other faces of the blanks. The improved method also facilitates the final shaping and edge grinding of the lenses to prepare them for insertion into spectacle frames.

In order to assist in an understanding of the present invention certain terms employed herein are defined for the purpose of this application as follows:

(1) The front surface or face of a lens or lens blank is the one which will be farthest from the eye of the wearer of spectacles containing the finished lens.

(2) The rear surface or face of a lens or lens blank is the one which will be nearest the eye of such wearer.

(3) A lens blank is a piece of optical glass of considerable larger outline than that of the lens to be made from the blank and which has a ground and polished front lens surface. It may or may not have a bifocal portion set into its front face.

(4) A finished lens is one which has a polished lens surface on both its faces and which also is shaped and has its edges ground to fit the spectacle frame.

(5) Lens power in diopters is the reciprocal of the focal length of the lens in meters measured from the center of the rear surface of the lens.

(6) The power of a lens surface is the same as that of a lens having such surface on one face and a plane lens surface on the other face.

(7) A plus lens is one which has a front lens surface of greater power than its rear lens surface.

(8) A minus lens is one which has a front lens surface of lesser power than its rear surface.

(9) The optical center of a lens is the thickest point of a plus lens and the thinnest point of a minus lens. It is the point at which light will not be bent in passing through the lens and it will be apparent that the tangent planes to the front and rear lens surfaces will be parallel at the optical center.

(10) A meridian of a lens is a line in such a tangent plane at the optical center, which line passes through the optical center.

(11) The 180° axis of a lens is the horizontal meridian of the lens.

(12) Cylinder is the addition of a cylindrical lens surface to a spherical or plane lens surface to produce different lens powers along different meridians. Combinations of spherical and cylindrical lens surfaces produce toroidal surfaces.

(13) The optical axis of a lens is the meridian along which the lens has the least power if cylinder is present and if no cylinder is present, it is defined as the 180° axis.

(14) The geometrical center of a lens is a point on the lens which is halfway between the horizontal extremities of the finished lens and also halfway between the vertical extremities of the lens. Its position in the finished spectacles is determined by the geometry of the lenses and of the spectacle frame which are prescribed.

(15) The geometrical axis of a lens is a line parallel to the 180° axis and passing through the geometrical center.

(16) Decentration is the distance in millimeters which the optical center is displaced horizontally (horizontal displacement) and vertically (vertical displacement) from the geometrical center.

(17) Prism is the property of a lens which results from the lens being thicker along a meridian on one side of the geometrical center than on the other so as to present a wedged shaped portion of the lens to the eye. Prism is measurable in prism diopter which is the distance in centimeters which a light beam is displaced from a straight line at a distance of one meter from the lens as a result of passing through the geometrical center of the lens. As defined above decentration actually produces prism and is usually prescribed for producing relatively small amounts of prism. When large amounts of prism are desired and particularly in cases where the amount of prism will place the optical center outside the edge of the finished lens, prism is specified along either the 180° axis (base in or base out) or at right angles thereto (base up or base down) or both. The base refers to the thicker portion of the prism.

Lens blanks of the type contemplated by the present invention, as received from the manufacturers, are of glass having a standard index of refraction and have a plane or spherical lens surface on their front faces. Such front lens surfaces may range from zero diopters (a plane surface) up to approximately ten diopters, the usual range being between 6 and 8 diopters. For multifocal lenses, the lens blanks will also have fused into their front surfaces smaller lens portions having a different index of refraction. Thus surfaces between the main portion of a blank and the bifocal portion will be such as to decrease the focal length through the bifocal portion so as to add diopters in a range between 0.5 and 4 diopters and usually between 0.75 and 2.75 diopters. The bifocal lens portions will have a variety of shapes depending upon the manufacturer and the use for which the finished spectacles are intended.

In any event all of the elements of a spectacle prescription including spherical and cylinder lens surfaces, decentration and prism are ground on the rear surface of the lens. The lens power in diopters will be the difference between the powers of the front and rear lens surfaces. In general, a lens blank will be selected such that the front surface of the lens will be convex and have a base power, which is the power along the optical axis, which is approximately 6 diopters.

The lens blank itself has no optical center or optical axis. In the finished lens the optical center and optical axis must be precisely positioned relative to the geometrical center and geometrical axis in accordance with the prescription. For a lens having no bifocal portion, the positions on the blank of the optical center and optical axis of the finished lens may be arbitrarily selected within limits but for a lens having a bifocal portion, the positions on the blank of the respective centers and axes of the finished lens relative to the bifocal portion are precisely determined by the prescription.

By the prior art practices all of the grinding and polishing operations on the rear surface of the blank are carried out with reference to the optical center and optical axis of the finished lens as determined by repeatedly calipering the thickness of the lens at predetermined spaced points. A data sheet is first prepared by a skilled technician including lens style and shape, bifocal size and position, location of optical center and axis, center and edge thickness, decentration, prism, etc. The location of the optical center and optical axis of the finished lens is marked on the blank and since the position of such optical center on the blank is, in general, different from the actual center of the blank, the edges of the blank are broken away to provide four equally circumferentially spaced calipering points adjacent the edges and equidistant from the optical center. This is done by hand chipping or crumbling and leaves a jagged edge around at least portions of the lens blank. It requires considerable skill and even so results in substantial breakage of blanks. No predetermined peripheral outline is produced or employed in the process.

The blank is then cemented to one end surface of a lens block, which is usually a cylindrical piece of iron. A special thermo-plastic cement is employed and the cementing operation requires heating of both the lens blank and the block as well as the cement, thus frequently causing cracking of the lens blank due to temperature strains. In most cases the optical center marked on the blank is centered on the block by eye and if cylinder is present, the optical axis is aligned with marks on the block. If large amounts of decentration or prism are required, however, the blank may be shifted or tipped on the block so that the optical center is not at the center of the block. Excess cement must usually be removed from some or all of the calipering points and all of the above is tedious and time consuming.

The block with the blank cemented thereon may be employed for hand grinding and polishing operations but the rough grinding is usually done by positioning the block with the lens blank thereon in a machine known as a generator. For lens having cylinder the lens blank is oscillated past and in contact with the rim of a cup shaped wheel containing imbedded diamonds so as to cut the desired surface on the rear face of the blank. When producing lens having no cylinder, a different type of generator which rotates the lens blank in contact with a similar wheel may be employed. Fine grinding and polishing is then accomplished on suitable shaped laps using progressively finer abrasives. This can also be a hand operation but is generally performed in machines which engage the other end of the block from the lens blank to hold the blank against a lap and then produce relative movement between the blank and the lap while an abrasive is supplied to the lap.

The positioning of the lens blank on the block is not a precision operation and also the cement frequently allows movement of the lens blank relative to the block under the pressure and heat produced in the grinding operations. Repeated calipering of the lens blank is therefore required during the grinding operations. The partly finished lens blank may have to be repositioned on the block or correcting hand grinding operations carried out to produce the required lens surface. When polished, the lens blank is removed from the block by a chilling operation and any adhering cement is dissolved off by a volatile solvent, all of which is time consuming and even hazardous.

The optical center and optical axis of the lens is then relocated on the ground and polished blank by optical means and the power of the lens is checked. The geometrical center and geometrical axis is then located and marked on the lens blank. The lens blank is then shaped and edge ground to produce a finished lens fitting the spectacle frame.

In accordance with the present invention the entire lens grinding and polishing operation is carried out after the lens blank has been edge shaped to give it a predetermined peripheral outline having an index portion. All grinding and polishing operations are carried out with reference to such predetermined periphery. Such periphery has a known relation to some definite characteristic of the finished lens, such as the optical or geometrical center, and the index portion has a known relation to the direction of the optical axis of such lens. Preferably such periphery has a predetermined relation to the geometrical center of the finished lens and the index portion thereof bears a predetermined angular relation to a line through such center and parallel to the optical axis of the lens. In the preferred method specifically described in the present application, the geometrical center of the finished lens is first located on the blank and also the direction of and position of a line through such center and parallel to the optical axis is located on the blank. Glass is then removed by a grinding operation from the edge of the lens blank to produce a shaped blank having a periphery of predetermined outline. Such periphery surrounds and bears a predetermined relation to such geometrical center and has a shaped index portion which bears a predetermined angular relation to the line referred to. Subsequent grinding and polishing operations are carried out while the blank is held in proper position by lens blank holders engaging the periphery of the shaped blank including the index portion thereof.

The simplest and most satisfactory periphery is one having a circular outline concentric with the geometrical center of the finished lens except for a short chordal portion parallel to the line through such axis which is parallel to the optical axis of the finished lens. Simple chucks or holders can be provided for engaging such periphery and holding the thus initially shaped lens blanks in proper position in lens surface generating machines. Provision can be made for displacing such holders laterally from the position in such machines which would grind the optical center of the lens at the geometrical center. For example, adapters for known types of lens surface generators can be employed to provide such displacement. Thus any decentration prescribed can be produced and such adapters can be constructed to have scales reading in prescribed decentration. Furthermore, all but extremely large amounts of prescribed prism can be converted to decentration and produced in like manner. For greater amount of prism the lens blank holders of the adapters can be provided with lens blank tipping elements or devices to enable generation of lenses having the required amount to prism.

Simple lens blank holders engaging such periphery can also be employed to hold the shaped and rough ground lens blanks in the lapping machines mentioned above without substantial modification of such machines. The grinding and polishing carried out in such machines is entirely controlled by the peripheral shape of the blank so that no calipering of the blank is required at any time. In fact the manner in which the process is carried out eliminates any necessity for locating the optical center and optical axis on the polished lens blank by optical means or otherwise. For any given lens such center and axis will have a definite relation to the periphery of the lens blank including the index portion thereof. Since the geometrical center of the finished lens bears a predetermined relation to the periphery of the ground and polished blank and the geometrical axis bears a known angular relation to the index portion of such periphery, a rotatable holder of the general type discussed above can be employed as a locating device to enable the ground and polished blank to be transferred to an edge shaping machine for producing any desired shape of finished lens with the geometrical and optical centers properly located.

It is therefore an object of the present invention to provide an improved method for producing lens surfaces on spectacle lens blanks.

Another object is to provide a method for grinding a lens surface on a face of a spectacle lens blank in which the lens blank is initially edge shaped to provide it with a predetermined periphery and a grinding operation is carried out with reference to such periphery.

Another object of the invention is to provide a method of producing a lens surface on a face of a spectacle lens blank in which the lens blank is first shaped to provide a periphery having a predetermined relation to a known characteristic of the finished lens, such as the geometrical center thereof, and to have an index portion having a predetermined angular relation to the direction of the optical axis of the finished lens and a lens surface is ground on the rear surface of said blank with reference to such periphery and index portion.

A further object of the invention is to provide a method of producing a lens surface on the rear face of a lens blank in which a lens blank is shaped to provide a periphery having a predetermined relation to the geometrical center of the finished lens and an index portion having a predetermined angular relation to a line through such center and parallel to the optical axis of the finished lens, and such shaped blank is held by such periphery and such index portion in proper positions for grinding and polishing a lens surface on such rear surface and in which method such periphery and index portions can be utilized to control the final shaping of the finished lens so that repeated calipering of the blank and lens in the grinding and polishing operation can be obviated and also the optical relocation of the various centers and axes of the lens prior to final shaping can be eliminated.

Other objects and advantages of the invention will appear in the following description thereof given in connection with the attached drawings showing suitable apparatus for carrying out the invention, in which drawings;

FIG. 1 is a front elevation of one type of lens blank having a bifocal portion and having the geometrical center of the finished lens marked thereon and a line through such center and parallel to the optical axis of the finished lens also marked thereon;

FIG. 2 is a vertical section through the lens blank of FIG. 1 taken on the line 2—2 of FIG. 1;

FIG. 3 is a rear elevation of a suction cup lens blank support employed in lens blank positioning and indexing devices which can be employed to carry out the present process;

FIG. 4 is a vertical section through the suction cup support of FIG. 3 taken on the line 4—4 of FIG. 3;

FIG. 5 is a vertical longitudinal section through a lens blank positioning device showing the suction cup support of FIGS. 3 and 4 in position therein and showing the lens blank of FIGS. 1 and 2 in dash-dot lines as it is held in proper relation for positioning on the suction cup support;

FIG. 6 is a fragmentary end elevation on an enlarged scale of a portion of the positioning device of FIG. 5 taken on the line 6—6 of FIG. 5;

FIG. 7 is a fragmentary sectional view on an enlarged scale of a portion of the positioning device of FIG. 5, showing a chuck for receiving the suction cup support;

FIG. 8 is a fragmentary end elevation of the chuck of FIG. 7;

FIG. 9 is a side elevation of a portion of a lens blank shaping and indexing device which can be employed to carry out the present invention, certain parts being shown in vertical section;

FIG. 10 is a fragmentary vertical section taken on the line 10—10 of FIG. 9, showing an indexing cam and a portion of a control switch;

FIG. 11 is a fragmentary vertical section taken on the line 11—11 of FIG. 9, showing the lens blank being shaped and indexed;

FIG. 12 is a vertical section through the blank shaping and indexing device of FIG. 9, taken on the line 12—12 of FIG. 9 and showing the pivotal mounting of such device;

FIG. 13 is a front elevation of a lens blank after having its periphery shaped in the blank shaping and indexing device of FIGS. 9 to 12;

FIG. 14 is a side elevation of an adaptor for a lens surface generator or rough grinding device, which adaptor receives and holds in proper position relative to a grinding wheel the peripherally shaped lens blank of FIG. 13;

FIG. 15 is an end elevation on an enlarged scale of the lens blank holder end of the adaptor of FIG. 14 with certain parts in a different position than in FIG. 14 and with the adaptor rotated ninety degrees from the position it occupies in the machine in order to align certain parts with the same parts in FIG. 16;

FIG. 16 is a plan view of the end of the adaptor shown in FIG. 15 with parts broken away to show internal structure;

FIG. 17 is a diagrammatic top view of a lens surface generator utilizing the adaptor of FIG. 16;

FIG. 18 is a diagrammatic side elevation of the generator of FIG. 17;

FIG. 19 is a vertical elevation through a lens blank after a lens surface has been generated on its rear or convex surface to produce a minus lens;

FIG. 20 is a front elevation of a lens blank holder which can be employed to hold the lens blank of FIG. 19 during fine grinding and polishing operations on the rear surface of the lens, such holder being suitable for lens blanks having cylindrical as well as a spherical lens surface on its rear face;

FIG. 21 is a horizontal section through the lens blank holder of FIG. 20, taken on the line 21—21 of FIG. 20;

FIG. 22 is a side elevation of the lens blank holder of FIGS. 20 and 21 with parts broken away to show internal structure and with a lens blank in position therein;

FIGS. 23 is a view similar to FIG. 22 of a modified lens blank holder particularly adapted for lens blanks having a spherical lens surface on its rear face;

FIGS. 24 is a fragmentary front elevation of a lapping machine for fine grinding and polishing the rear face of a lens blank with both cylinder and a spherical lens surface on its rear face;

FIG. 25 is a view similar to FIG. 24 of a lapping machine for fine grinding and polishing the rear face of lens blanks having a spherical lens surface only thereon;

FIG. 26 is a side elevation of a modified positioning device for positioning a partly finished lens blank on another suction cup support for a lens shaping step;

FIG. 27 is a vertical section on an enlarged scale taken on the line 27—27 of FIG. 26 and showing a lens blank holder employed in the positioning device of FIG. 26;

FIG. 28 is a side elevation of the holder of FIG. 27 with parts broken away to show internal structure; and FIG. 29 is a front elevation of a finished lens on which possible optical and geometrical centers and axes are indicated by dots and by dash lines respectively.

Referring more particularly to the drawings, the glass lens blank 36 of FIGS. 1 and 2 may have any of various outlines depending upon the manufacturer and may or may not have a bifocal portion, such as the portion 38 of different index of refraction set into the front face 40 of the blank and fused thereto. The front face 40 has a ground and polished spherical lens surface and the lens blanks are furnished by the manufacturer having such surfaces over a range of lens powers in diopters. The surface 42 between any bifocal portion 38 and the main lens is such as to add lens power and blanks are also furnished having bifocal portions providing selected adding lens powers over a range of such powers.

The process of the present invention is employed to grind and polish a prescription lens surface on the rear surface 42 of a lens blank, such as the blank 36. A blank is usually selected which has a front lens surface with a power enabling a rear lens surface having a base power of approximately 6 diopters to be ground on the rear surface to produce a lens of the desired power. The base power is the power of the lens surface along the optical axis. If a bifocal lens is desired, the blank is also selected so that it will have a bifocal portion of the correct additional power and of the desired size and shape.

In carrying out the present process the first step is to determine from the prescription the location of the geometrical center and the direction of the optical axis of the finished lens and mark such center 44 and a line 46 through such center parallel to such direction on the lens blank. If there is no bifocal portion called for by the prescription, the position of such center 44 and the direction of such line 46 is arbitrary, the geometrical center of the finished lens usually being placed at the center of the lens blank. If a bifocal portion is prescribed, the geometrical center of the finished lens does have a definite position relative to the bifocal portion and the same is true of the optical axis. Any skilled optician can by known procedures determine and mark on the blank the position of the point on the lens blank which corresponds to the geometrical axis of the finished lens, and can also determine the direction on the blank of the optical axis of the finished lens and can mark on the blank a line through the geometrical center and parallel to the optical axis. If the lens surface to be produced has no cylinder, then the direction of the optical axis is assumed to be that of the 180° axis and a line through the geometrical center parallel to such axis is marked on the lens blank.

The next step in the method is to position the lens blank on a support so that it can have its periphery properly shaped. A positioning device 48, such as shown in FIG. 5, can be employed for this purpose. Such device includes a base 50 upon which is mounted a mirror chamber 52. The chamber 52 has a barrel 54 extending horizontally therefrom and terminating at its outer end in a cushion member 56, for example of nylon, against which the rear surface of the lens blank 36 can be positioned. The barrel also contains a transparent member 58 normal to its axis and adjustably mounted therein for movement diametrically of the barrel in two directions at right angles to each other by the screws 60. The transparent member has a central dot 62 and a horizontal line 64 marked thereon.

The mirror chamber has an inclined mirror 66 mounted therein in position to reflect light entering through the barrel 54 upwardly through a vertically extending eyepiece 68 having a small aperture 70 therein. It will be apparent that the lens blank 36 can be manually positioned in front of the barrel 54 with its rear surface against the cushion member 56 and moved until the dot 44 and line 46 marked thereon align with the dot 62 and line 64 of the transparent member as observed through the aperture 70. This will place the dot 44 and line 46 on the lens blank 36 in a definite position relative to the axis of the barrel 54.

The positioning device also has an upstanding support member 72 in which is clamped an air cylinder 74. The cylinder has a plunger 76 therein urged to a retracted position in the cylinder by a compression spring 78 and which is projected from the cylinder by air pressure under control of a valve 80 opened by a push button 82 on the upper end of the valve. The plunger is axially aligned with the barrel 54 and has fixed on its end directed toward such barrel a cylindrical socket member 83 for receiving a cylindrical cup base element 84 attached to the rear portion of a suction cup member 86 of rubber or similar elastomer. The socket member 83 has a cylindrical socket 88 therein receiving and fitting the cup base element 84. A key 90 extends laterally across the bottom of the socket 88 and the cup base element 84 has a laterally extending slot 92 fitting such key. The key 90 and slot 92 are both displaced slightly from a diameter of the socket or of the cup base member so that the base element 84 has one angular position only in the socket.

When the dot 44 and line 46 on the lens blank is manually held in alignment with the dot 62 and line 64 on the member 58 with the blank in the position shown in FIG. 5 and the valve push button 82 depressed, the suction cup will be forcibly applied to the front surface of the lens blank with its base element 84 in a definite angular relation with the line 46 on the lens blank and in axial alignment with the dot 44 on the lens blank. Upon release of the button 82, the lens blank is held in position on the base element 84 by the suction cup 86 and such base element is withdrawn from the socket 88 so that the suction cup assembly with a lens blank attached thereto is left in the hand of the operator.

The base element 84 with the lens 36 attached thereto by the suction cup is then placed in the socket of a socket member 94 of a lens blank shaping and index grinding device, a portion of which is shown in FIG. 9. Such device includes a base 96 upon which is pivotally mounted a grinding frame 98 for movement about a horizontal pivot 100 shown in FIG. 12. The pivot 100 is positioned at the end of a laterally extending arm 101 of the frame 98 so as to be laterally spaced from the main portion of the frame 98 and has its axis parallel to the general longitudinal axis of the frame. The main portion of such frame can be pivoted to a raised position above the grinding position shown by admitting air to an air cylinder 102 shown in FIG. 12, such air cylinder having its lower end pivoted at 104 to the base 96 of the lens blank shaping and index grinding device. The upper end of the plunger of the cylinder is pivoted at 105 to the main portion of the frame 98. Release of air from the cylinder permits the main frame to be lowered to the grinding position shown in FIGS. 9 and 12.

The socket member 94 is mounted concentrically upon the end of a shaft 106 journaled in the frame 98 and extending longitudinally thereof so as to be parallel to the axis of the pivot 100. Such shaft is driven from an electric motor and speed reducer unit 108 carried by one end of the frame 98. During index grinding of the edge of the lens blank, the shaft and socket member are slowly rotated by such unit. The socket member 94 of FIG. 9 is similar to the socket member 83 of FIGS. 5, 7 and 8, except that one side is provided with an enlarged slot 110 to enable the base element 84 of the suction cup 86 to be inserted into the socket member 94 by a motion radially of the socket member. Such socket member has a key 112 similar to the key 90 of FIGS. 7 and 8, so as to hold the suction cup base element in a definite angular relation to the shaft 106. Such key extends in a direction parallel to the radial motion by which the base element 84 is inserted into the socket member.

The base element 84 and lens blank 36 secured thereto by the suction cup 86 is held securely in position in the socket member by a plunger 114 of an air cylinder 116 secured in the frame 98 in axial alignment with the shaft 106. The plunger has a cushioned head 118 concentrically and rotatively mounted on its end in position to engage the rear surface of the lens blank 36 and it will be apparent that admission of air under pressure into the cylinder 116 will move the plunger 114 to the position shown to cause the head 118 of the plunger 114 to engage and hold the lens blank 36 securely in position for rotation by the shaft 106. It will be further apparent that the plunger 114 can be moved to inoperative or retracted position to the right in FIG. 9 by a spring (not shown) when the air is exhausted from the cylinder 116. Air under pressure can be admitted and exhausted from the cylinder 116 under manual control of a valve 120 provided with an actuating lever 122.

When the frame 98 is in the lower position shown in FIGS. 9 and 12, the edge of the lens blank 36 is in position to engage an annular abrasive element 124 forming part of an upwardly extending flange of a cup shaped wheel 126, of which a portion only is shown. Such wheel is rotated rapidly about a vertical axis (not shown) and the abrasive element 124 is preferably of a type containing partly embedded diamonds so as to rapidly remove glass from the edge of the lens blank 36.

The shaft 106 has fixed thereon a cam member having an integral lens blank pattern cam portion 128 and an integral switch operating cam portion 130. The periphery of the cam portion 128 is shown as being circular except for a short chordal portion 132. A micrometer stop 134 is positioned on the base of the machine to have its upper surface engaged by the periphery of the cam portion 128. It will be apparent that rotation of the shaft 106 to rotate the cam portion 128 in contact with the stop 134 and to simultaneously rotate the lens blank 36 in contact with the rapidly moving abrasive element 124 will grind a periphery on the lens blank which is similar to that of the cam portion 128. The size of the resulting shaped lens blank can be adjusted within considerable limits by vertically adjusting the stop 134.

A snap action switch 136 is positioned on the base 96 to have its plunger engaged by the switch cam portion 130 to hold the switch in closed position whenever the frame 98 is in its lowered position and the lens blank 36 is in position to be edge ground.

To thus grind the periphery of a lens blank 36, such a blank held on a base element 84 is positioned in the socket member 94 while the frame 98 is held in its upper position by the air cylinder 102 of FIG. 12. At this time the plunger 114 is retracted toward the right in FIG. 9. The control lever 122 of valve 120 is then manually actuated to cause the plunger 114 to be moved to the left in such figure by the cylinder 116 to engage the head 118 of the plunger with the rear surface lens blank and hold the base member 84 attached thereto securely in the socket member 94. A control switch (not shown) is then actuated to cause a solenoid valve (also not shown) to release air from the cylinder 102 of FIG. 12. This lowers the frame 98 to the position shown in FIGS. 9 and 12 so that the edge of the lens blank rests on the abrasive element 124, the wheel 126 being rotated continuously to maintain the abrasive element in rapid motion. This causes the cam portion 130 to close the switch 136 to start the motor of the unit 108 to slowly rotate the shaft 106 and at the same time, light a pilot lamp 138.

The shaft 106 is rotated a definite number of turns, usually 2 or 3, and then the solenoid valve referred to above is actuated to admit air under pressure to the cylinder 102 of FIG. 9 to raise the frame 98 so as to remove the lens blank 36 from contact with the abrasive element 124 and also remove the cam portion 130 from engagement with the plunger of the switch 136 to stop the motor of the unit 108 and thus stop the shaft 106. Another pilot lamp 140 may be lighted when the motor is stopped. While the frame 98 is in the position shown and the shaft 106 rotated, the periphery of the lens blank 36 will be brought to a definite shape determined by the cam portion 128. Such shape preferably has a circular or arcuate portion 142 and a chordal portion 144 which, in general, will be of less length than the radius of the arcuate portion.

When the frame 98 has thus been raised, the valve 120 can have its control lever manually actuated to cause retraction of the plunger 114 and the base element 84 and the shaped lens blank 36a can be removed from the socket member. The lens blank which now has a shaped periphery with an index portion 144 can be removed from the suction cup by tilting the cup on the blank by lateral pressure on the base element 84. The resulting shaped lens blank 36a is shown in FIG. 13 and has the arcuate portion 142 of its periphery concentric with the geometric center 44 of the finished lens and the index chordal portion 144 parallel to the line 46 which in turn is parallel to the optical axis of the finished lens. The lens blank 36a is then ready for rough grinding of a lens surface on its rear face.

The suction cup 86 and attached base element can be returned to the positioning device of FIG. 5 for positioning on another lens blank 36. It will be apparent that a plurality of such suction cup assemblies can be provided so that a plurality of lens blanks can be progressing through the method at the same time and that a plurality of lens blank shaping index grinding devices, such as shown in FIGS. 9 and 12, can be arranged around the periphery of the abrasive wheel 126 so that an operator may keep them in successive operation.

An adaptor 146 for a commercial type of lens surface generator is shown in FIGS. 14 to 16. Such commercial type of lens surface generator without the adaptor shown in FIGS. 14 to 16 has been employed by the prior art to grind spherical or toroidal lens surface on the rear face of a lens blank while such blank is cemented to an end surface of a cylindrical lens block described above. The lens block is received in a socket in a lens block holder and held in a desired angular position in such socket by set screws. If the lens is cemented on the block in the correct position and the angular position of the block in its socket is correct, the optical center will be at the desired position on the lens blank and the optical axis will extend in the required direction. Both of such positions are difficult to attain and also the cement frequently gives under pressure and heat produced in the grinding so that the lens surface is incorrectly generated. This is detected by calipering the blank and must be corrected by hand grinding or by resetting the blank on the block or resetting the block in the machine and carrying out a further machine grinding or both.

The adaptor 146 disclosed in this application has a lens blank holder 148 which engages the accurately formed periphery of the lens blank 36a of FIG. 13 to hold it securely in position in the lens surface generator. The details of such holder 148 are most clearly shown in FIGS. 15 and 16. Such holder is a cylindrical member with an axially extending socket 150 therein having an inner periphery at its open end which accurately fits the outer periphery of the lens blank 36a, a key member 151 providing a flat index surface fitting the index portion 144 of the blank. The socket 150 has an annular cushioning element 152, for example, of nylon supported adjacent but spaced from its open end to receive the edge of the front surface of the lens blank. The interior of the socket 150 is connected to a source of vacuum through the port 154 and pipe connection 156 including a flexible portion 157 shown in FIG. 14.

When a lens blank is placed in position in the socket 150 so as to rest on the cushioning element 152 while a vacuum is produced on the socket, the lens blank is held securely in the position shown in FIG. 14. A vacuum gauge 158 may be mounted on the machine and connected in the vacuum line to show the amount of vacuum therein. The reading of such vacuum gauge may be employed to indicate whether the lens blank 36a is correctly positioned and being properly held in the socket 150.

The holder 148 for the lens blank 36a is mounted upon a cylindrical slide member 160 for rotation of such slide member relative to such holder about the cylindrical axis of the holder. Thus the holder 148 has an extension 162 of reduced diameter having an annular groove 164 in which is positioned a split ring 166 of wedge shaped cross section. The axial extension 162 is received in a cylindrical axially extending socket in the slide member 160 and is held in position by set screws 167. A brake portion 168, of nylon for example, is positioned between the ends of the ring 166 and engaged by a locking screw 170 having an actuating handle. The screws 167 and 170 extend radially inwardly through the rim of such socket and into engagement with the split ring 166 and brake portion 168 to hold the lens blank holder 148 in position relative to the slide member 160. The lens blank holder 148 and slide member 160 are thus relatively rotatable about the axis of the arcuate portion of the inner periphery of the socket 150 adjacent its open end. It is the slide member 160 which is actually rotated since the holder 148 is held against rotation, as explained below, and the amount of such rotation can be read on a scale 172 on the holder 148. It will be apparent that the handle 170 may be turned to tighten its associated screw to clamp the slide member 160 in angularly adjusted position relative to the holder 148.

The slide member 160 is mounted upon a central member 174 for diametrical sliding movement relative to such central member. Thus the slide member has a diametrically extending dove tail portion 176 received in a corresponding dove tail groove in the central member. The slide member also has an axially extending projection 178 received in an axial recess 180 of larger diameter in the central member. A screw threaded member 182 extends in a direction parallel to the dove tail portion 175 through a screw threaded bore in the projection 178 and through an aligned smooth bore in the central member 174. The screw threaded member 182 has a head 184 on one end and has a knurled knob 186 non rotatively secured to its other end. The head 184 and knob 186 engage the central member 174 so that rotation of the knob 186 slides the slide member 160 in a direction parallel to a diameter of the holder 148 and of the arcuate peripheral portion of the lens blank 36a. A scale (not shown) may be provided to show the distance the axis of the holder 148 is displaced from the axis of the center member 174.

Another slide member 188 which is similar to the slide member 160 is provided at the other end of the center member 174. Such slide member may have a dove tail portion 190 received in a dove tail slot in the central member 174 to enable the central member to be moved diametrically of the axis of such slide member by means of a knob 192, which may be similar to the knob 186. The direction of sliding movement of the central member 174 relative to the slide member 188, is however, at right angles to the sliding movement of the slide member 160 relative to the central member. The slide member 188 is also mounted for rotation on a support member 194. Such mounting may be the same as that of the slide member 160 and lens blank holder 148 and will not be further described.

The lens blank holder 148 is held against rotation relative to the support member while being free to move laterally of the axis of the support member 194 in any direction. This is accomplished by a pair of universal joints 196 and 198 at the opposite ends of a shaft 200. One universal joint 196 is connected by vertically spaced links 202 to the support member to provide for longitudinal movement of the holder 148 relative to the support member 194 caused by its relative lateral movement. The other universal joint is connected by vertically spaced rigid elements 204 to the lens blank holder 148. It will be apparent that the central member 146 and slide members 160 and 188 can be rotated a desired angular distance relative to the support member 194 and lens blank holder 148 while the holder 148 is held against rotation relative to the support member. Also the lens blank holder can be displaced independently in two directions at right angles to the axis of the central member 174. The rotation of the central member 174 is equal to any angle between the optical axis and the geometrical axis of the finished lens and the scale 172 can be graduated to read in such angle. This allows the optical axis of the finished lens to be made parallel to the line of action of the generator as explained below, and also angularly displaces the geometrical axis of the finished lens from such line of action by the angle between such geometrical and optical axes. The sliding members 160 and 188 thus enable any desired decentration to be made and such decentration is parallel or at right angles to the geometrical axis. Thus the values given on the prescription relative to the angle of the optical axis and to decentration can be directly set on the scales of the adaptor 146. It is apparent that the universal joint mechanism including the universal joints 196 and 198 may be omitted and both the members 148 and 188 manually set at the same angle relative to the lens blank holder 148 and support member 188 respectively, as shown by the scales 172.

The line of action of the generator is assumed to be parallel to the plane of the paper in FIG. 14. A cup shaped grinding wheel 206 which is rapidly rotated about its axis of symmetry is shown as having its edge in contact with the rear surface of the lens blank 36a Such wheel is mounted on a drive shaft 208 so as to have its axis of symmetry and of rotation at an angle to the longitudinal or cylindrical axes of the support member 194 and lens blank holder 148. Such wheel is also given oscillatory pivoted motion about an axis perpendicular to the plane of the paper in FIG. 14 and spaced to the left of the wheel 206 but passing through the extended longitudinal axis of the support member 194. Diagrammatic views of such a generator are given in FIGS. 17 and 18 in which the pivot just described is indicated at 210.

The drive shaft 208 of the wheel 206 is journaled in a motor casing 212 which in turn is mounted on an angularly adjustable member 214 angularly adjustable on a slide member 216 about a vertical pivot 218. The pivot 218 is located directly below the rim of the cup shaped wheel and such wheel is displaced laterally of the shaft a distance equal to the average radius of the rim of the wheel. The motor casing is, in fact, adjustable axially of the shaft 208 on the angularly adjustable member by means (not shown) to maintain such relationship as the wheel 206 wears. The member carrying the cup shaped wheel 206 is thus angularly adjustable about the pivot 210 relative to the slide member 216 in the direction of the double pointed arrow 219 of FIG. 17.

The slide member 216 is adjustable longitudinally of another pivoted member 220, i.e. in the direction of the double pointed arrow 221 of FIGS. 17 and 18. The pivoted member 220 is pivotally mounted on the pivot 210 referred to above for oscillatory pivoted motion in the direction of the double ended arrow 222 of FIG. 17. The pivot 210 is carried by another slide member 224 (FIG. 18) which can be adjusted longitudinally of the frame 226 of the machine as indicated by the double pointed arrow 228.

It will be apparent that adjustment of the two slide members 216 and 224 simultaneously in opposite directions, while the pivoted member 220 is centered, will cause the pivot 210 to be effectively adjusted longitudinally of the machine without affecting the position of the pivot 218 or the position of the cup wheel 206. The radius of oscillation of the rim of the cup wheel 206 is, however, changed. By properly adjusting such radius and also adjusting the angular relation of the member 214 about its pivot 218 relative to the slide member 216, any desired cylinder, spherical, or toroidal lens surface within wide limits can be generated on the rear surface of the lens blank 36a by holding such surface in position to be contacted by the rim of the wheel, rapidly rotating such wheel, and oscillating such wheel about the pivot 210. The line of action of the generating operation may be considered to be in the direction of the arrow 222 and at the surface of the lens blank 36' being ground and also at a vertical position intersecting the extended axis of the shaft 208. Most of the lens surfaces generated have a base lens power along their optical axes which is 6 diopters or close to 6 diopters, since a lens blank is usually selected having a front lens surface which requires a rear lens surface with a base lens power of approximately 6 diopters.

The adaptor 146 has its support member 194 axially slidable in a member 230 mounted on the frame 226 of the machine so that the lens blank 36a can be fed into contact with the cup shaped wheel 206 and withdrawn from contact therewith. The member 230 is preferably mounted on the base of the machine for pivotal movement about a vertical pivot 232 so that the lens blank holder 148 of the adaptor can be swung away from the wheel 206 for insertion and removal of a lens blank. During a lens surface generating operation, the adaptor occupies the position shown in FIG. 17. The lens blank holder shown in FIG. 14 holds the index portion 136 of the lens blank parallel to the line of action of the generator as described above, and as such index portion is parallel to the optical axis of the finished lens, any cylinder for which the generator is set has its axis in the proper direction.

Rotating the center member 174 through the desired angle between the optical axis and the geometrical axis enables any decentration to be made by movements parallel and perpendicular to the geometrical axis. Moderate amounts of prism can be converted to decentration and set on the adaptor. For larger amounts, wedge shaped spacing rings (not shown) having at one end an outer periphery fitting the inner periphery of the holder and at the other end an inner periphery of the lens blank, can be positioned between the lens blank 36a and the holder 148 to tilt the lens blank relative to the holder. A series of rings each providing a fixed amount of tilt or a known type of adjustable tilting ring can be employed.

Generators of the general type described with respect to FIGS. 17 and 18 can be employed to generate spherical lens surfaces but simpler types of generators can be employed to generate such spherical lens surfaces. In such generators a cup shaped wheel, such as the wheel 206 of FIGS. 14, 17 and 18, is rotated about its shaft 208 but the axis of such shaft is held in a fixed position during the generating operation instead of being oscillated about a pivot 210. The lens blank is held in substantially the position shown in FIGS. 14, 17 and 18 but is rotated about an axis normal to the lens surface being ground and through the optical center of such surface. In prior lens grinding operations the lens blank is cemented on the end of a cylindrical lens block with the desired optical center of the finished lens centered on the end of the block so that the block can be merely mounted in a concentric socket on the end of a shaft. In the present method where the geometrical center of the finished lens bears a predetermined relation to the periphery of a peripherally shaped lens blank, an adaptor and associated lens blank holder similar to that shown in FIGS. 14 to 16 can be employed in order to shift the desired optical center of the finished lens into coincidence with the axis about which the lens is rotated.

In any event a lens blank such as 36b of FIG. 19 having a roughly ground rear lens surface 42a is produced in the generator. It can be removed from the generator by releasing the vacuum in the holder 148. Such lens blank still has its original front lens surface 40 and its peripheral outline produced in the original lens blank shaping and index edge grinding step. Such lens blank is ready for fine grinding and polishing and for this purpose is positioned in a lens blank holder 234, such as that shown in FIGS. 20 to 22, if its lens surface 42a contains cylinder as well as spherical lens surface components.

The holder 234 has a cylindrical body member 236 having a concentric socket 238 in one end, the socket having an inner periphery adjacent its open end fitting the outer periphery of the lens blank 36b and having an axially inner portion of small diameter providing a shoulder for receiving and supporting the edge of the lens blank 36b as shown in FIG. 22. The lens blank is repeatedly subjected to heavy stresses parallel to the lens surface 42a and applied from the walls of the socket 238 during the five grinding and polishing operations, and it has been found preferable to clamp the blank radially in the socket. This can be accomplished, for example, by a tapered spring urged wedge 240 positioned in a tapered chordal slot in the holder body member 236 and having a flat surface engaging the index portion on the lens blank 36b. A leaf spring 242 between the body member 236 and the small end of the wedge tightens the wedge against the index portion of the lens blank to wedge the blank in the holder against lateral motion with respect to such holder.

The lens blank 36b is held against displacement axially from the holder by a suction cup 244 mounted on a base member 246 positioned in a bore in the other end of the holder body 236 and held in position against a shoulder therein by a compression spring 248 engaging a shoulder on the base member 246 and engaging an annular member 250 secured in the bottom of the socket 238 by screws 252. When a lens blank 36b is placed in position in the socket 238 and held therein, the suction cup 244 can be pressed against its front surface by the pushing axially on the exposed end of the base member 246 to compress the spring 248. The suction cup adheres to the front surface of the lens blank and the spring 248 resiliently urges the base member 246, suction cup 244 and lens blank 36b held thereby in a direction to hold the lens blank in the socket.

To provide for later discharge of the lens blank from the holder, the suction cup has a central bore 254 therein communicating with a spring pressed normally closed valve including a valve member 256 having a stem portion 258 extending axially of the base member 246 to the exterior thereof. Depression of the stem portion 258 will open the valve to admit air to the interior of the suction cup to thereby release the lens blank from such cup. Releasing the wedge member 240 by pushing on its end while pushing on the exposed end of the base member 246 and the valve stem portion will discharge the lens blank from the holder 234.

The holder 234 has a pair of inserts 260 of hardened material in its surface opposite the socket 238 which are adapted to receive the hardened ends 262 (FIG. 24) of a pair of downwardly projecting pins 264 carried by an oscillating arm 266 of a fine grinding and polishing machine, a portion of which is shown in FIG. 24. Such machine is a standard type of commercial lens blank grinding and polishing machine except that the pins 264 of such standard machines are pointed so as to be received in conical recesses in the lens blocks to which lens blanks are adhesively secured in prior spectacle lens blank grinding and polishing operations. Such machine has provision for holding a replaceable cast iron lap 268 in a stationary position below the pins 264. The arm 266 is free to rotate about an axis perpendicular to a plane through the axes of the pins 264 and is spring pressed toward the lap and oscillated by the machine so as to carry the holder 234 and lens blank 36a in a complex path over the surface of the lap 268. A suspension of abrasive particles is delivered over the surface of the lap 268 through flexible tubes 270 connected to fixtures on the arm 266.

The lap 268 is provided with an upper surface 272 having the reverse of the shape of the desired rear lens surface 42a on the lens blank. A stock of laps with most of the lens surfaces likely to be encountered is maintained in a lens grinding shop. Also automatic machines for cutting a desired surface on a lap are available so that a suitable lap can be rapidly made if none is in stock. The axis of such surface 272 on the lap 268, which corresponds to the optical axis of the finished lens, if cylinder is present, always extends parallel to a line through the ends 262 of the pins 264 and such line is also parallel to the lens engaging surface of the wedge member 240 of the holder and is thus parallel to the index portion 136 on the periphery of the lens blank 36b which is parallel to the desired optical axis of the finished lens. Merely positioning the lens blank 36b in the holder 234 and placing the holder in the machine of FIG. 24 will correctly position the lens blank 36b relative to the lap 268.

Grinding with progressively finer abrasive is continued for definite periods and finally a polishing paper having a very fine abrasive on its upper surface is placed on the surface 272 of the lap with its lower surface adhesively secured to the lap. Continued operation of the machine results in a polished lens rear surface on the lens blank 36b. Actually the lens blank holder 234 with the lens blank therein along with the lap 268 are transferred to different machines or different position on the same machine for each grinding or polishing operation with a finer abrasive and are carefully washed between such operations to remove coarse abrasive particles.

While the machine of FIG. 24 can be employed to fine grind and polish spherical rear surfaces on lens blanks 36b, a simpler and more rapid machine for such purpose employing a modified type of lens blank holder 274, shown in FIG. 23, is advantageously employed. The lens blank holder 274 differs from the lens blank holder 234 of FIGS. 20 to 22 in that it has a single recessed insert 260 of hardened material and such insert is positioned in the center of the exposed surface of a modified base member 276 for the suction cup 244. Such modified base member does not have a centrally disposed valve 256 but such valve (not shown in FIG. 23) may be positioned in a bore extending inwardly at an angle from the exposed end of the base member so as to communicate with the bore 254 and provide for a projecting valve stem 258. In the grinding and polishing operations, the base member 276 is subjected to axial forces tending to compress the spring 248 and eject the lens blank 36b. To prevent axial movement of such base member relative to the body portion of the lens blank holder, radially extending screws 278 in such body member can be tightened to engage and hold the base member 276 rigidly in position. Such screws are tightened before the lens blank holder is placed in the spherical fine grinding and polishing machine of FIG. 25. Otherwise the lens blank holder 274 of FIG. 23 is the same as that of FIGS. 20 to 22.

The fine grinding and polishing machine of FIG. 25 has a lap 280 with an upper spherical surface 282 and is mounted on a vertically extending shaft 284 for rotation about a vertical axis. The lens blank in the holder 274 is held against the surface 282 by a pin 286 having a lower end engaging in the insert 260 of FIG. 23 and carried by an arm 288 which is spring pressed downwardly by spring means (not shown) but is otherwise stationary. The lens blank holder 274 is positioned to hold the lens blank 36b eccentrically on the lap surface and upon rotation of the lap 280 by its shaft 284, the lens blank holder and lens blank rotate about the axis of the holder. Abrasive is supplied to the surface 282 and except for the fact that the lap 280 and holder 274 rotate instead of the holder being oscillated to move the lens blank over the surface of the lap, the fine grinding and polishing operation is the same as that described relative to FIG. 24.

In any event a lens blank having polished front and rear surfaces is produced by the steps described with reference to FIGS. 20 to 25 while the lens blank is held in proper position by its shaped periphery. Such lens blank is discharged from the holders 234 or 274 by releasing the wedge member 240 and then, in the case of the holder 234, merely pushing the base member 246 axially inwardly of the body member 236 while at the same time pushing on the valve stem 258 to release the suction cup 244 from the lens blank. In the case of the holder 274 of FIG. 23, the screws 278 must first be loosened. The discharged lens blank 36b is then ready to have its edge shaped and ground to fit the prescribed spectacle frame.

The ground and polished lens blank may be further processed by the known procedures in the art in which the optical center and optical axis are first located by optical means and then the geometrical center and axis determined and marked on a surface of the lens blank. Using such marks on the lens blank as a guide, the first operation is usually to cut a groove with a diamond tool along a path in the shape of the lens and slightly oversize on a lens surface of the blank. This can be done in a machine using a template cam. Then excess glass is then manually broken or crumbled from the lens blank. The final edge shaping is then completed in an edge grinding machine also employing a template cam. A series of time consuming steps is thus employed some of which, such as the glass crumbling operation, is hazardous and results in considerable lens spoilage.

In accordance with the present invention, the location of geometrical center of the finished lens on the lens blank 36b can be easily determined by its relation to the shaped periphery of the lens blank and the same is true of the direction of the geometrical axis of the finished lens. The edging operation on the lens blank can thus be carried out with reference to the periphery of the lens blank without the necessity of locating the optical center or axis. It is possible to employ a lens blank positioning device similar to that of FIGS. 5 to 8, but having a lens blank holder 290, such as shown in FIGS. 26 to 28, instead of a mirror chamber 52 (FIG. 5) and associated apparatus. The lens blank holder 290 is mounted for rotation about a horizontal axis through the geometrical axis of the finished lens. Thus it may be mounted in an aperture 292 in a vertically extending standard 294 on a base 296. The lens holder 290 is held against axial movement in the standard by bearing rings 298 and 300 secured to the standard and to each other and can be held in adjusted angular position by a knurled headed clamping screw 302 in the standard bearing against a brake block in turn bearing against the holder 290.

The holder 290 has an exposed end provided with a socket 304 with an inner periphery fitting the outer periphery of the lens blank 36b. It also has an annular cushioning element 306 positioned in the socket for receiving the edge of the lens blank. The lens blank can be positioned in the socket 304 and the lens holder turned by its knurled other end an angular distance from the zero position shown in FIG. 27, which is the angle between the optical axis of the finished lens and its geometrical axis. A suction cup 308 (FIG. 26) similar to but smaller in size than the suction cup 86 of FIG. 5 is then placed on the front surface 40 of the lens blank by mechanism which can be identical with that of FIG. 5, including an air cylinder 74 mounted in a standard 72 on the base of the device and a valve 80 actuated by a push button 82.

The suction cup 308 is attached to a base member 84 which may be the same type as that of FIGS. 4 and 5. The base member 84 with the lens blank 36b attached thereto by the suction cup 308 can then be employed to properly position the lens in any type of edge shaping machine. A preferred machine is a grinding machine which may be similar to the machine of FIGS. 9 to 12 except that it has provision for substituting proper spectacle lens template cams for the cam 128 of FIGS. 9 and 10.

A lens blank can be ground by the steps just described to the outline of a finished lens, such as the shape of the lens 310 of FIG. 29. The optical center and optical axis of such lens will be correctly located and for purposes of illustration, an optical center is shown by a dot 312 and an optical axis by a dotted line 314. The optical center 312 is shown as having both horizontally and vertically decentration from the geometrical center 44 and the optical axis is shown as being at an angle to the geometrical axis 46.

The decentration referred to is produced by moving the slide 160 of FIGS. 14 and 16 horizontally relative to the center member 174 and the center member 174 vertically relative to the slide 188 by turning the knobs 186 and 192. The angular relation of the optical axis 314 (FIG. 29) relative to the geometrical axis 46 is produced in the first instance by rotating the center member 174 and slide members 160 and 188 of FIGS. 14 and 16 relative to the lens blank holder 148 and support member 194 of the adaptor 146. All subsequent steps of the invention maintain the relationships once established in the lens surface generating step carried out employing the adaptor 146. Thus all the generating or coarse grinding steps as well as the fine grinding and polishing steps and lens shaping steps are carried out with reference to the geometrical center of the finished lens and a line through such center parallel to the optical axis of the lens, since the positions of such center and line on the lens blank have a predetermined relationship to an initially formed periphery and peripheral index portion on the lens blank. The various steps of the process are thus controlled from the initially formed periphery and peripheral index portion on the lens blank without the necessity of repeated calipering or other tests on the lens blank.

Although a circular periphery except for a short chordal index portion is the preferred outline initially produced on the lens blank, it is apparent that other peripheral outlines may be employed and that the index portion thereof need not be a straight line in the form of a chordal parallel to the optical axis of the lens. The requirements are that the outline selected enable the initially shaped lens blank to be mechanically positioned in some known relation to a definite point on the finished lens and that it have a distinctive index portion bearing some known angular relation to the direction of a definite axis of the finished lens.

The geometrical center of the finished lens and a line through such center parallel to the optical axis are, however, distinctly advantageous as the definite point on the finished lens and the line providing the direction of a definite axis on the finished lens. It is not essential that such center and line actually be marked upon a surface of the lens blank as a device is now being developed which will correctly position the suction cup lens support 86 of FIG. 5 upon a lens blank without the necessity of marking the surface of such blank and then optically aligning such marks with reference marks in a positioning device. In any event, it is the predetermined periphery of the initially shaped blank which is employed as a guide for the grinding and polishing operations to produce the prescription lens surface and which can also be employed as a guide for finally edge shaping the lens blank to provide a finished lens.

I claim:

1. In a method of producing a prescription spectacle lens from a spectacle lens blank, the steps which comprise, initially shaping the edge of said lens blank to provide a predetermined periphery on said blank including an index portion having a predetermined relation to selected characteristics of said prescription lens, positioning and holding said blank by said periphery, and shaping a face of said blank to produce a prescription lens surface on said face while thus holding said blank.

2. In a method of producing a prescription spectacle lens from a spectacle lens blank, the steps which comprise, initially grinding the edge of a lens blank having a lens surface on one face to provide a predetermined periphery on said blank including an index portion having a predetermined position relative to selected characteristics of said prescription lens, positioning and holding said blank by said periphery, and grinding and polishing the other face of said blank to produce a prescription lens surface on said other face while thus holding said blank.

3. In a method of producing a finished prescription lens including grinding of a lens surface on a face of a spectacle lens blank, the steps which comprise, edge shaping the lens blank to provide a shaped lens blank having a periphery including an index portion which has a predetermined relation to the geometrical center and to the direction of the optical axis of the finished lens, and holding said shaped blank by said periphery during grinding of a prescription lens surface on said face.

4. In a method of producing a finished prescription spectacle lens including the grinding of a prescription lens surface on one face of a spectacle lens blank having a lens surface on its other face, the steps which comprise, edge shaping the lens blank to produce a shaped lens blank with a periphery which has a predetermined relation to the geometrical center of the finished lens, which periphery includes an index portion establishing the direction of the optical axis of the finished lens, holding said shaped blank by said periphery including said index portion, and grinding a prescription lens surface on said face while thus holding said blank.

5. In a method of producing a finished prescription lens including grinding a prescription lens surface on a face of a spectacle lens blank, the steps which comprises, edge shaping said blank to provide a shaped lens blank with a predetermined periphery having a predetermined relation to a definite point on the finished lens and an index portion having a predetermined relation to a definite axis of said finished lens, and holding said shaped blank by said periphery while grinding said face to provide a prescription lens surface thereon.

6. In a method of producing a finished prescription lens including grinding a prescription lens surface on a face of a spectacle lens blank, the steps which comprise, edge shaping said blank to provide a shaped lens blank with a predetermined periphery having a predetermined relation to a definite point on the finished lens and an index portion having a predetermined relation to a definite axis of said finished lens, holding said shaped blank by said periphery while grinding said face to provide a prescription lens surface thereon, and employing said periphery as a guide for edge shaping the resulting blank to produce a finished lens.

7. In a method of producing a finished prescription lens including grinding a prescription lens surface on a face of a spectacle lens blank, the steps which comprise edge shaping said blank to provide a shaped lens blank with a predetermined periphery having a predetermined relation to the geometrical center of the finished lens and an index portion having a predetermined angular relation to the optical axis of said finished lens, holding said shaped blank by said periphery while grinding said face to provide a prescription lens surface thereon, and employing said periphery as a guide for edge shaping the resulting blank to produce a finished lens.

8. In a method of producing a finished prescription lens including generating a prescription lens surface on a face of a spectacle lens blank, the steps which comprise edge shaping said blank to provide a shaped lens blank with a predetermined periphery having a predetermined relation to the geometrical center of the finished lens and an index portion having a predetermined relation to the optical axis of said finished lens, and holding said shaped blank by said periphery while moving said blank in a line of action past a lens surface grinding wheel with said face in contact with said wheel to grind a prescription lens surface thereon.

9. In a method of producing a finished prescription lens including generating a prescription lens surface on a face of a spectacle lens blank, the steps which comprise edge shaping said blank to provide a shaped lens blank with a predetermined periphery having a predetermined relation to the geometrical center of the finished lens and an index portion having a predetermined relation to the optical axis of said finished lens, and holding said shaped blank by said periphery while moving said blank in a line of action past a lens surface grinding wheel with said face in contact with said wheel and with said optical axis parallel to said line of action to grind a prescription lens surface thereon.

10. In a method of producing a finished prescription lens including generating a prescription lens surface on a face of a spectacle lens blank, the steps which comprise, edge shaping said blank to provide a shaped lens blank with a predetermined periphery having a predetermined relation to the geometrical center of the finished lens and an index portion having a predetermined relation to the optical axis of said finished lens, and holding said shaped blank by said periphery while moving said blank in a line of action past a lens surface grinding wheel with said face in contact with said wheel and with said optical axis parallel to said line of action to grind a prescription lens surface thereon providing an optical center of said lens, and displacing said geometrical center from said optical center during grinding of said prescription lens surface to provide any prescribed decentration of said optical center from said geometrical center.

11. In a method of making a spectacle lens from a glass lens blank having a lens surface on one surface thereof, the steps which comprise, removing glass from the edge of said blank to provide a shaped blank having a predetermined periphery and a centrally disposed point corresponding to the geometrical center of said lens and in a predetermined position relative to said periphery and with said periphery including a shaped index portion having a predetermined angular relation to a line through said center and parallel to the optical axis of said lens, and generating a prescription lens surface on the other surface of said blank while holding the resulting shaped blank by said periphery including said index portion.

12. In a method of making a spectacle lens from a glass lens blank having a lens surface on one surface thereof, the steps which comprise, removing glass from the edge of said blank to provide a shaped blank having a predetermined periphery and a centrally disposed point corresponding to the geometrical center of said lens and in a predetermined position relative to said periphery and with said periphery including a shaped index portion having a predetermined angular relation to a line through said center and parallel to the optical axis of said lens, and generating a prescription lens surface on the other surface of said blank by moving said blank parallel to said line past a lens surface grinding wheel with said other surface in contact with said wheel while holding the resulting shaped blank by said periphery including said index portion.

13. In a method of making a spectacle lens from a glass lens blank having a lens surface on one surface thereof, the steps which comprise, removing glass from the edge of said blank to provide a shaped blank having a predetermined periphery and a centrally disposed point corresponding to the geometrical center of said lens and in a predetermined position relative to said periphery and with said periphery including a shaped index portion having a predetermined angular relation to a line through said center and parallel to the optical axis of said lens, generating a prescription lens surface on the other surface of said blank by moving said blank parallel to said line past a lens surface grinding wheel with said other surface in contact with said wheel to provide a lens b'ank having an optical center while holding the resulting shaped blank by said periphery including said index portion, and displacing said geometrical center from said optical center during said generating to provide any prescribed decentration of said optical center from said geometrical center.

14. In a method of grinding a spectacle lens prescription on one surface of a lens blank having a spherical surface on its other surface, the steps which comprise, marking on a surface of said lens a dot corresponding to the geometrical center of said lens and also marking on a surface of said lens a line through said center parallel to the optical axis of said lens, positioning said lens on a suction holding device with said dot concentric with the axis of said holding device and with said line having a predetermined angular relation to an index element on said device, grinding the edge of said blank while held on said device to provide a shaped blank having a shaped periphery including an arcuate major portion concentric with said point and a chordal index portion of less length than the radius of said major portion and parallel to said line, removing said shaped blank from said holding device and positioning it in a shaped blank holding device having an inner edge fitting said periphery, and generating a lens surface on said one surface of said shaped blank by moving said shaped blank in an arcuate path with said one surface directed toward and in contact with the rim of a cup-shaped grinding element rotated about its axis of symmetry while said shaped blank is held in said shaped blank holder with said chordal portion parallel to the plane of said path, displacing prior to said generating said shaped blank holding device in a direction generally parallel to said one surface any distance necessary to cause the optical center of said lens to pass through said axis of symmetry.

15. In a method of producing a spectacle lens prescription on one surface of a lens blank having a spherical surface on its other surface, the steps which comprise, marking on a surface of said lens a dot corresponding to the geometrical center of said lens and also marking on a surface of said lens a line through said center parallel to the optical axis of said lens, positioning said lens on a suction holding device with said dot concentric with the axis of said holding device and with said line having a predetermined angular relation to an index element on said device, grinding the edge of said blank while held on said device to provide a shaped blank having a shaped periphery including an arcuate major portion concentric with said point and a chordal index portion of less length than the radius of said major portion and parallel to said line, removing said shaped blank from said holding device and positioning it in a shaped blank holding device having an inner edge fitting said periphery, generating a lens surface on said one surface of said shaped blank by moving said shaped blank in an arcuate path with said one surface directed toward and in contact with the rim of a cup-shaped grinding element rotated about its axis of symmetry while said shaped blank is held in said shaped blank holder with said chordal portion parallel to the plane of said path, displacing prior to said generating said shaped blank holding device in a direction generally parallel to said one surface any distance necessary to cause the optical center of said lens to pass through said axis of symmetry, and polishing the resulting generated lens surface on a correspondingly shaped polishing surface while said shaped lens blank is held in a shaped blank holding device with said chordal portion parallel to any cylindrical axis of said polishing surface.

16. In a method of producing a finished spectacle lens having a prescription lens surface on one of the surfaces and a spherical surface on its other surface, the steps which comprise, marking on said other surface a dot corresponding to the geometrical center of said lens and a line through said center parallel to the optical axis of said lens, positioning said lens on a suction holding device with said dot concentric with the axis of said holding device and with said line having a predetermined angular relation to an index element on said device, grinding the edge of said blank while held on said device to provide a shaped blank having a shaped periphery including an arcuate major portion concentric with said point and a chordal index portion of less length than the radius of said major portion and parallel to said line, removing said shaped blank from said holding device and positioning it in a shaped blank holding device having an inner edge fitting said periphery, generating a lens surface on said one surface of said shaped blank by moving said shaped blank in an arcuate path with said one-surface directed toward and in contact with the rim of a cup-shaped grinding element rotated about its axis of symmetry while said shaped blank is held in said shaped blank holder with said chordal portion parallel to the plane of said path, displacing prior to said generating said shaped blank holding device in a direction generally parallel to said one surface any distance necessary to cause the optical center of said lens to pass through said axis of symmetry, polishing the resulting generated lens surface on a correspondingly shaped polishing surface while said shaped lens blank is held in a shaped blank holding device with said chordal portion parallel to any cylindrical axis of said polishing surface, and thereafter shaping the edge of a spectacle lens by reference to said periphery including said chordal index portion.

References Cited in the file of this patent
UNITED STATES PATENTS
1,881,982    Uhlemann _____ Oct. 11, 1932